Patented Feb. 16, 1926.

1,573,353

UNITED STATES PATENT OFFICE.

GEORGE H. MAXWELL, OF PHOENIX, ARIZONA.

PROCESS OF USING OR APPLYING STICKY, HEAT-SENSITIVE SHOE-BOTTOM FILLER TO SHOE BOTTOMS.

No Drawing. Application filed September 14, 1921. Serial No. 500,709.

*To all whom it may concern:*

Be it known that I, GEORGE H. MAXWELL, citizen of the United States, and resident of Phoenix, Arizona, have invented an Improvement in Processes of Using or Applying Sticky, Heat-Sensitive Shoe-Bottom Filler to Shoe Bottoms, of which the following description is a specification.

The kind of filler patented in Patent No. 861,555, July 30, 1907, has always been put on the market in the form of loaves as shown in the drawings of Patent No. 832,002 Sept. 25, 1906, and used as described in Patent No. 808,224, Dec. 26, 1905 (further set forth in Pat. No. 808,227, Dec. 26, 1905). All of said patents and their mutual relations in constituting a new system are further set forth in vol. 252, Federal Reporter 148-176. My present invention aims to speed up the process, shorten the time required to get the filler ready for the shoe-operative to apply to the shoe-bottom, hasten the even dissemination of a softening heat throughout the mass of the filler, and introduce a film of moisture in and among the granules and binder so as to lighten the labor element in the process, while likewise providing the filler itself as an article of manufacture in an entirely new and much more readily handled form, advantageous for packing, handling thereafter in the shoe factory, and use in the filler applying machine. The slowness or delay which has always attended the use of this kind of filler has been due to three conditions, viz, first, the predominating cork-content makes the filler a heat insulator or impervious to quick penetration by heat, second, the loaf form necessitates considerable compression in making the loaf so that the heat can attack the outside only, penetrating thence inwardly and that slowly because of the aforesaid character of the filler and the dense mass form of the package, and, third, the character of the cork and the binder necessitates a low heat, as the cork would char and lose its life or resiliency under a continued high heat.

According to my present invention I provide the filler in small, fragmentary, non-compressed and open condition. This enables the filler to be shipped and handled with the utmost convenience (very much like biscuits for instance). The filler itself has the same composition and characteristics as set forth in the above mentioned patents, being non-oxidizing, permanently plastic, quick setting, rendered sluggishly fluid by low heat and is normally sticky, composed of finely comminuted cork or the like mixed with a permanently sticky, waxy binder. In order to get this into the small fragmentary condition mentioned and to the best advantage, I pour a mass of the hot semi-fluid shoe filler in a heap and then skim off the top so as to leave a bottom sheet or layer of the filler without compression. I then cool this layer, or permit it to cool until substantially set or coherent. When set and substantially firm, I tear the layer into small fragments and dust the latter with fine, dry cork to prevent said fragments sticking together. In this manner each segregated fragment is in a highly non-compressed or open condition and can be shipped to the shoe factory in a box or crate the same as crackers or any other small, frail articles. I do not mean that the fragments or segregated pieces are wholly separated, as of course the extremely sticky nature of the filler prevents entire separation being maintained after the pieces are brought together in mass, as when packed for shipment, but I mean that the fragments or pieces are individually loose or open internally and that when in a mass said fragments are relatively loose or open with relation to each other. In other words the mass (when in or as dumped from a box or crate and when again packed or dumped into the applying machine to be melted with steam and heat) is made up of a multitude of small, fragmentary portions, each in a noncompressed or open condition, and all approximately held from one another by the intervening envelopes of the relatively dry dust or comminuted material. The mass is subdivided into said small pieces by intervening planes or dividing surfaces of slight resistance formed by the material originally dusted dry onto the said small pieces. Only as much of the dry material remained on as would stick and hence the pieces when put into a box become stuck together in a mass but only slightly and although there is a resultant actual mass condition it is not homogeneous but is subdivided or cut here and there throughout into its original small pieces or fragments by planes, areas or surfaces of slight resistance to penetration by steam and separation by hand or a small shovel. The present application relates to the use or handling and application of this filler to the shoe-bottoms in the process of manufacture of shoes. Arrived at the factory this form of the filler is advantageous to the operator who simply dips out the small fragments readily with his hands or a small shovel and puts the mass into the filler applying machine to be melted. At this stage a further advantage of this form of filler takes place over the old loaf form, viz, the filler being in relatively loose and open condition itself in each fragment and the various fragments being relatively loose and open with relation to each other, I drive steam from the bottom upward into and through the mass of filler simultaneously throughout the whole bottom or at least at a series of points and at the same time I apply dry heat throughout the upper part of the mass. The result is that the entire mass is quickly reduced to the proper semifluid, melted condition for application by the operator to the shoe bottoms. Steam is much more penetrative than dry heat alone, and hence the combination of the two, whereby the steam drives along the dry heat, hastens the melting. The dry heat is reinforced by the wet steam heat which facilitates the heat penetration of the granular mass, helps to separate it rapidly into the desired loosely flowing condition which is specially adapted for the required spreading or laying within the shoe-bottom and also protects it against burning so that the high heat mentioned is safe which could not otherwise be used. This could not be accomplished with the filler in the form of loaves. For the reasons above set forth a considerable and long continued heat was necessary to reduce the filler loaf to a plastic condition. No amount of steam pressure would drive the steam into or through the loaf and hence only the outside of the loaf would respond to the heat until the loaf had become practically disintegrated and this latter result could take place only after a long continued, slow, even subjection of the loaf to low heat. Therefore it will be seen that my present process greatly facilitates the speed and ease of handling this refractory filler. In order further to facilitate the speed and convenience of its use I apply an extra steam heat to that portion of the filler mass which is nearest to the operator and therefore first to be used by him, viz. the lower front portion of the mass. This causes the filler to move or drop away at the bottom downward or forward from the impending mass or body above, thereby keeping the open, steam-receptive condition above and tending to prevent the solid, heavy compacting together of the melting portions. The use of steam at the bottom of the mass as distinguished from dry heat results in coating all the particles of the filler with moisture so that the sticky mass of filler gets a fluffy or light, highly efficient looseness at and for the moment of spreading within the shoe-bottom, and hence is more readily handled and applied by the operator to the shoe bottom by means of his heated spatula as set forth in the above patents. This moisture is of course very slight and not sufficient to interfere with the sticking of the filler into the shoe bottom. The problem herein solved is difficult not only because of the heat-resistant and normally dense or impervious character of the filler and its liability to char and scorch under attempts to melt and condition it quickly with dry heat but the average operator is heedless and as the work is usually paid as piece-work he has heretofore rushed the heat, filler and work too fast for safety and efficiency. Accordingly it is the principal aim of my process to permit and invite the highest speed possible, and that without danger and even with improved results. In the copending applications and the patents subsequently mentioned herein, I emphasize the use of high heat, forced steam delivery and rapid penetration of the dry heat and steam, all being made possible by the present process in which the high heat desired is used safely because it is carried by steam simultaneously (and under pressure) to all the bottom of the filler-mass at a plurality of points or portions so that at the same time that the dry and extra high heat has heated the supporting metal the adjacent filler particles have simultaneously been rendered safe by all being enveloped with films of moisture and this is continuous, both metal and filler being kept conditioned for the highest yet safe service. This is promoted by the loose and loosening feature of the filler and the process which results in maintaining a considerable depth or extent of melted and conditioned filler disintegrating and dropping or tending to press and flow down loosely by gravity all the time. The sudden formation of the slimy paste from the starchy element of the binder (when the preferred form of filler is used) aids, the sudden melting of the wax likewise, aids, the concentrated heat (to produce the steam), especially in the electric form of heater, further promotes rapidity, the waste or extra heat left therefrom after producing the steam, but yet necessary for the speed sought, gives the desired high dry heat around and in the reservoir and keeps the work basin properly hot. All the foregoing together with concentrating the heat and effort at the bottom, economizes the heat, particularly so with electricity.

This application is one of several concurrent and copending applications which together constitute a new system of handling and using shoe-bottom filler for and in connection with shoe manufacture. My applications Serials Nos. 560,800 (now Patent 1,512,229), 633,148, 656,496, and 656,497 (now Patent 1,512,230), cover the machine for use in the shoe factory in applying the filler of the present application to the shoe bottom and in carrying out the process of the present application; Serial No. 500,711 (now Patent 1,510,237) covers the apparatus for forming said filler; and Serial No. 584,879 (now Patent 1,510,238) covers the shoe-bottom filler mass as an article of manufacture and the process of making said filler; while the preferred type of filler (and the method of making) best adapted to all the foregoing is covered in Patents Nos. 1,032,312 and 1,121,688, the broad process of using in Patents Nos. 1,118,161, and 1,227,502, and the machine for using (considered broadly in certain respects), in Patent No. 1,225,372.

My invention is further defined in the appended claims as follows:

1. The herein described process of conditioning, for filling operations, a shoe bottom filler of granular, sticky material slowly penetrative by heat and liable to be charred and burned at high heat, consisting in passing a mass of the filler in non-compacted and readily permeable condition in a prescribed confined course, permeating the mass with a moist heating agent during such passage, and withdrawing the thus conditioned and non-compacted material from the mass.

2. The herein described process of conditioning, for filling operations, a shoe bottom filler of granular, sticky material slowly penetrative by heat and liable to be charred and burned at high heat, consisting in passing a mass of the filler in non-compacted and readily permeable condition in a prescribed course by means of gravity, permeating the mass with a moist heating agent during such passage, and withdrawing the thus conditioned and non-compacted material at the lower part of the mass.

3. The herein described process of conditioning, for filling operations, a shoe bottom filled of granular sticky material, slowly penetrative by heat and liable to be charred and burned at high heat, consisting in passing a mass of the filler in non-compacted and readily permeable condition in a prescribed course by means of gravity, during such passage of the mass initially subjecting it to dry heat and subsequently permeating it with a moist heating agent, and withdrawing the thus conditioned and non-compacted material from the lower part of the mass.

In testimony whereof, I have signed my name to this specification.

GEORGE H. MAXWELL.